United States Patent [19]

Vitchenko et al.

[11] 4,091,299

[45] May 23, 1978

[54] DEVICE TO ELECTRICALLY CONNECT ROTOR WINDING OF SYNCHRONOUS ELECTRICAL MACHINE TO EXCITER

[76] Inventors: Vladimir Stepanovich Vitchenko, Vitebsky prospekt, 29, korpus 2, kv. 142; Gennady Konstantinovich Smirnov, Prazhskaya ulitsa, 120, kv. 132; Vladimir Grigorievich Shalaev, Novoizmailovsky prospekt, 55, kv. 92, all of Leningrad, U.S.S.R.

[21] Appl. No.: 751,350

[22] Filed: Dec. 16, 1976

[51] Int. Cl.² .......................................... H02K 13/00
[52] U.S. Cl. ................................... 310/71; 339/5 R; 310/165
[58] Field of Search ................. 310/71, 165, 61, 60 A, 310/68 R; 339/5 R, 8 R, 5 P, 6 R, 222 R

[56] References Cited

U.S. PATENT DOCUMENTS

| | | | |
|---|---|---|---|
| 2,497,141 | 2/1950 | Schultz | 310/165 X |
| 3,808,490 | 4/1974 | Khutoretsky | 310/165 |
| 3,894,253 | 7/1975 | Willyoung | 310/61 |
| 3,955,111 | 5/1976 | Weghaupt | 310/61 X |
| 4,014,599 | 3/1977 | Bogdanov et al. | 339/5 R |

*Primary Examiner*—Donovan F. Duggan
*Attorney, Agent, or Firm*—Lackenbach, Lilling & Siegel

[57] ABSTRACT

The device to electrically connect the rotor winding of a synchronous electrical machine to an exciter comprises at least two pairs of conductors constructed in the form of current-conducting rods, one of the pairs extending from the rotor winding of the synchronous electrical machine towards the exciter, the current-conducting rods of this pair being bent at a right angle and forming plate-like contact surfaces, the other pair of current-conducting rods extending from the exciter towards the rotor of the synchronous electrical machine. The proposed device further includes two current-conducting wedges which are in contact with the bent current-conducting rods, two flexible buses which connect the current-conducting wedges to the unbent pair of current-conducting rods, and two insulation spacers, each supporting a respective current-conducting wedge on the side of its connection to each of said flexible buses.

7 Claims, 4 Drawing Figures

DEVICE TO ELECTRICALLY CONNECT ROTOR WINDING OF SYNCHRONOUS ELECTRICAL MACHINE TO EXCITER

FIELD OF THE INVENTION

The present invention relates to electrical machines and, more particularly, to devices to electrically connect the rotor winding of a synchronous electrical machine to an exciter.

The invention is applicable in electric machine-building to electrically connect the rotor winding of a synchronous electrical machine to an exciter.

BACKGROUND OF THE INVENTION

At present, the power output of systems comprising a synchronous electrical machines as such, and an exciter which generates electric current to excite said machine, has increased dramatically to reach 1,200 to 1,300 megawatts. Systems with a power output of 1,600 to 2,000 megawatts are being developed. The increase in the power output is accompanied by an increase in exciting currents transmitted through the rotary part of the system from the exciter to the electrical machine. Transmission of such currents from the exciter to the electrical machine necessitates the use of highly reliable contact devices which can withstand increased vibration and centrifugal loads.

There is known a device to electrically connect the rotor winding of a synchronous electrical machine to an exciter comprising conductors, which are arranged in axial bores of the rotor shaft of the synchronous electrical machine and of the exciter shaft and are constructed as current-conducting rods, and flexible annular current-conducting washers that are insulated from the shaft. The current-conducting rods arranged in the axial bores of the rotor shaft of the synchronous electrical machine and the exciter shaft are connected to flexible buses, the place of connection being where said rods come out of said bores, said flexible buses being, in turn, bolted to said current-conducting washers.

This device is far too complicated. In addition, the flexible buses are not protected from the effects of centrifugal forces, which makes the device mechanically unreliable.

There is also known a device to electrically connect rotor leads of a synchronous electrical machine to an exciter, which comprises buses radially extending into the zone of conjugated half-sleeves and joined by bolts received in through holes of half-sleeves' flanges.

In this device, the electrically conjugated surfaces are located in the zone of the flanges of the half-sleeves, so the flange area, which is intended for torque transmission, is reduced; on the other hand, heavy exciting currents require large electrically conjugated surfaces, which accounts for a considerable increase in the flange size.

Besides, in this device the supply buses and the means to insulate them from the shaft are too complicated, because the heavy buses, which are bent at a right angle to the rotational axis of the machine, are subjected to substantial centrifugal loads caused by rotation of the shaft.

There is also known an electromechanical coupling unit which is used primarily in electrical machines. In this unit, the rotor windings are connected through wedge contacts.

This unit is marked by a large number of components; it is also complicated due to a large number of contacts.

Finally, there is known a contact device of a synchronous electrical machine, which is intended to electrically connect the rotor winding of the electrical machine to the latter's exciter.

The portions of the leads of the rotor winding of the synchronous electrical machine and of the exciter, which are to be connected, extend through the central bores of the shafts, are bent at a right angle and are tapered; arranged therebetween is a resilient current-conducting wedge provided with a longitudinal slot.

The device under review has two intermediate contacts for one polarity, whereby the reliability of the electrical connection is reduced. Furthermore, the manufacturing procedure envisages careful matching (for one polarity) of four conjugated tapered contact surfaces, which is a complicated task.

In addition, the assembly of this device requires a special device to hold in place the wedge at the moment the generator and exciter shafts come into contact.

SUMMARY OF THE INVENTION

It is an object of the present invention to simplify the manufacture of the device.

It is another object of the invention to simplify the assembly of the device at a power station.

It is still another object of the invention to increase the reliability of the electrical connection by reducing the number of intermediate contacts.

It is yet another object of the invention to improve the electric contact through self-orientation of electrically contacting surfaces.

The foregoing and other objects of the present invention are attained by providing a device to electrically connect the rotor winding of a synchronous electrical machine to an exciter, which comprises at least two pairs of conductors constructed in the form of current-conducting rods, one of the pairs extending from the winding of the rotor of the synchronous electrical machine towards the exciter, the current-conducting rods of this pair being bent at a right angle and forming plate-like contact surfaces, the other pair of current-conducting rods extending from the exciter towards the rotor of the synchronous electrical machine. The device also includes two current-conducting wedges which are in contact with the bent current-conducting rods, two flexible buses which connect the current-conducting wedges to the unbent pair of current-conducting rods, and two insulation spacers, each supporting a respective current-conducting wedge on the side of the wedge's connection to each of said flexible buses.

It is preferable that the supporting surface of each current-conducting wedge on the side of its connection to the flexible bus, as well as each insulation spacer upon which said supporting surface of the current-conducting wedge rests, should be perpendicular to the rotation axis of the rotors.

It is also preferable that each flexible bus should be connected to that portion of a respective current-conducting wedge which rests upon the insulation spacer adjacent to the butt end of the rotor.

According to the objects of the invention, each flexible bus may be connected to that portion of a respective current-conducting wedge which is in contact with the conductor bent at a right angle.

It is highly desirable that the supporting surface of the current-conducting wedge on the side of the wedge's connection to the flexible bus should be shaped as a convex sphere.

The present invention provides for reliable electric contact between the conductors of the rotor of a synchronous electrical machine and an exciter, when the conductors are made in the form of current-conducting rods. The high reliability of the electric contact is due to self-adjustment of the contact surfaces relative to one another, as well as to the use of centrifugal forces to produce contact pressure.

BRIEF DESCRIPTION OF THE DRAWINGS

Other objects and advantages of the present invention will become more apparent from the following detailed description of preferred embodiments thereof taken in conjunction with the accompanying drawings, wherein.

DETAILED DESCRIPTION OF THE INVENTION

Figure 1:
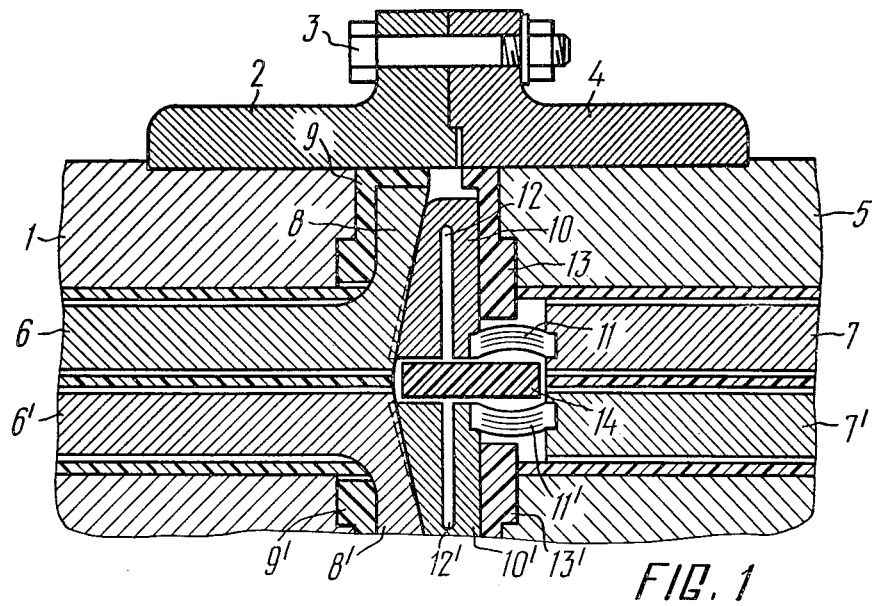
FIG. 1 is an elevational cross sectional view of a first embodiment of the device in accordance with the invention.

Referring now to the attached drawings, on a shaft 1 (FIG. 1) of a synchronous electrical machine there is mounted a half-sleeve 2 which is bolted at 3 to a half-sleeve 4 mounted on a shaft 5 of an exciter. Arranged in an axial bore (not shown) of the shaft 1 of the synchronous electrical machine are two conductors constructed in the form of current-conducting rods 6 and 6' which extend away from the rotor winding of the synchronous electrical machine. In an axial bore of the exciter shaft 5 there are also arranged two conductors constructed as current-conducting rods 7 and 7' which extend away from the exciter (not shown). The current-conducting rods 6 and 6', and 7 and 7' extend as far as the ends of their respective shafts 1 and 5. At the place where the current-conducting rods 6 and 6' come out of the shaft 1, said rods 6 and 6' are bent at a right angle and form plates 8 and 8' which are tapered. The plates 8 and 8' are insulated from the shaft 1 of the synchronous electrical machine and the half-sleeve 2 by profiled spacers 9 and 9' made from an insulation material (for example, from glass fiber). The spacers 9 and 9' are shaped so as to envelop the plates 8 and 8'.

The rotor winding of the synchronous electrical machine is connected to the exciter by means of resilient current-conducting wedges 10 and 10' manufactured, for example, from electrical copper or brass. On one side, said wedges 10 and 10' are in contact with the tapered surface of the plates 8 and 8'; on the other side, they are permanently connected (for example, by welding, soldering or riveting) through flexible buses 11 and 11' to the current-conducting rods 7 and 7' at the place where the rods come out of the axial bore of the exciter shaft 5.

In order to ensure their flexibility, said buses 11 and 11' are arched and assembled into a pack, for example, from copper sheets with a thickness of 0.3 to 0.5 mm. As a result, the buses 11 and 11' are pliable enough to reliably hold the current-conducting wedges 10 and 10' without resorting to any locking means; at the same time, while rotating, said flexible buses 11 and 11' do not obstruct radial motion of the current-conducting wedges 10 and 10'.

In order to make the current-conducting wedges 10 and 10' resilient, they are provided with longitudinal slots 12 and 12', respectively. The current-conducting wedges 10 and 10' are insulated from the exciter shaft 5 and the half-sleeve 4 and rest on spacers 13 and 13' manufactured from an insulation material (for example, glass fiber). The supporting surface of each conducting wedge 10 and 10' and the spacers 13 and 13' is perpendicular to the rotation axis of the shafts 1 and 5 of the synchronous electrical machine and the exciter, respectively. The angle between the tapered surface of each of the current-conducting wedges 10 and 10' and their supporting surfaces is selected to be somewhat greater than the angle between the tapered surfaces of the plates 8 and 8' and the supporting surfaces of the spacers 13 and 13', respectively. The profiles of the current-conducting wedges 10 and 10' are shown by the dash line.

The flexible bus 11 is connected to that portion of the current-conducting wedge 10 which rests upon the spacer 13. The cross-sectional dimensions of the above-mentioned portion of the current-conducting wedge 10 is selected depending upon the magnitude of the current produced by the rotor of the synchronous electrical machine. This equally applies to the flexible bus 11', the current-conducting rod 10' and the spacer 13'.

Arranged between the diametrically opposite current-conducting wedges 10 and 10' is a spacer 14 manufactured from an insulation material (for example, glass fiber).

Figure 2:
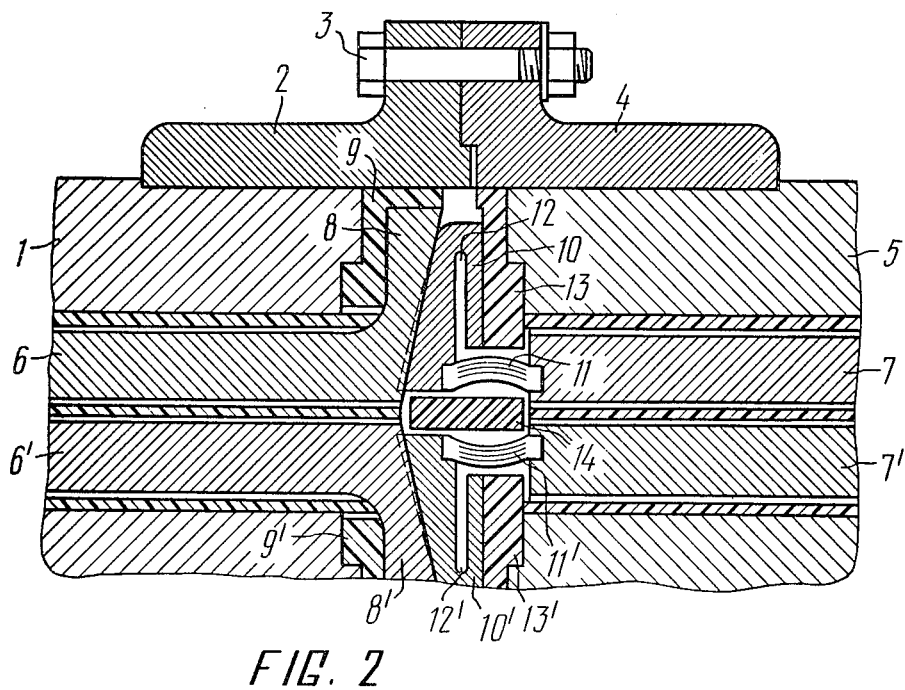
FIG. 2 is an elevational cross sectional view of a second embodiment of the device in accordance with the invention.

The second embodiment of the present invention is characterized in that the flexible bus 11 (FIG. 2) is connected to that portion of the current-conducting wedge 10 which is in contact with the plate 8 of the current-conducting rod 6. The cross-sectional dimensions of the above-mentioned portion of the current-conducting wedge 10 are selected without regard to the magnitude of the rotor current of the synchronous electrical machine. This equally applies to the flexible bus 11', the current-conducting wedge 10' and the plate 8' of the current-conducting rod 6.

Figure 3:
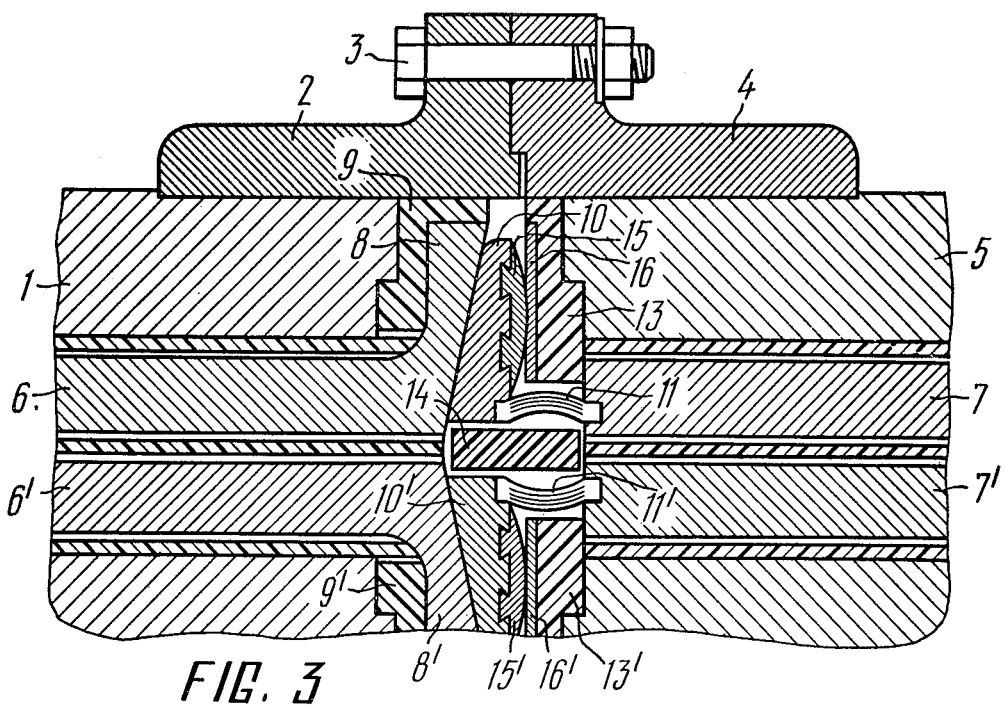
FIG. 3 is an elevational cross sectional view of a third embodiment of the device in accordance with the invention and FIG. 4 is a view of the butt end of the exciter's rotor, in accordance with the invention.

The third embodiment of the invention is characterized in that the current-conducting wedge 10 (FIG. 3) is monolithic, i.e. without the longitudinal slot 12, the supporting surface of the current-conducting wedge 10 on the side of its connection to the flexible bus 11 being shaped like a convex sphere, constructed, for example, as a cover piece 15 manufactured from a mechanically durable material (steel) and rigidly secured to the body of the current-conducting wedge 10, for example, by means of a dovetail joint or in any other known manner (by soldering, welding, a threaded joint, etc.). The supporting surface of the spacer 13 is provided with a flat cover plate 16 which is also manufactured from a mechanically durable material (steel). The mechanical strength of the cover plate 16 is somewhat less than that of the cover piece 15 of the current-conducting wedge 10. The idea is that as the cover piece 15 is subjected to mechanical stresses due to rotation of the device, said cover piece must not loose its spherical shape despite plastic deformations which occur at the area of its contact with the supporting surface of the cover plate 16.

The radius of the curvature of the spherical surface of the cover piece 15 is to be as great as possible, in order to provide a maximum area of contact with the cover plate 16 and to ensure free mutual orientation of the electrically conjugated surfaces of the current-conducting wedge 10 and the plate 8. The center of pressure of said contact area is located in the central portion of the electric contact area between the current-conducting wedge 10 and the plate 8.

The foregoing considerations concerning the third embodiment of the invention equally apply to the current-conducting wedge 10', the flexible bus 11' and the covers 15' and 16'.

Figure 4:
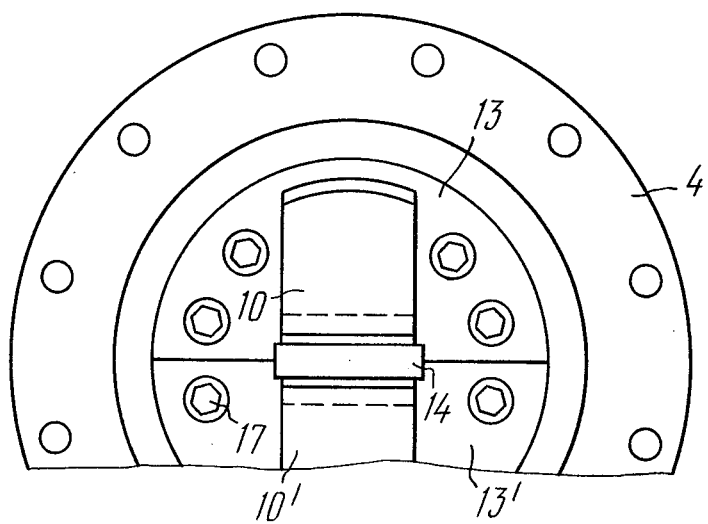

The profiled spacers 9 and 9' and the spacers 13 and 13' are secured to the shafts 1 and 5 of the synchronous electrical machine and the exciter, respectively, by bolts 17 (FIG. 4).

The device of the present invention operates as follows.

According to the first and second embodiments of the invention, in connecting the rotor of the exciter to that of the synchronous electrical machine, the orientation of the contact surface of the current-conducting wedges 10 and 10' (FIGS. 1 and 2) with respect to the contact surface of the plates 8 and 8' is effected by the compression of the contacting areas due to the elasticity of the current-conducting wedges 10 and 10'. As the device rotates, the current-conducting wedges 10 and 10' are set in radial motion due to the action of the centrifugal forces of gravity. This ensures accurate orientation of the contacting surfaces of the current-conducting wedges 10 and 10' and the plates 8 and 8', respectively, relative to each other, as well as their firm and uniform mutual pressure.

According to the third embodiment of the invention, in connecting the rotor of the exciter to the rotor of the synchronous electrical machine, the orientation of the contact surface of the current-conducting wedges 10 and 10', which is electrically conjugated with the contact surface of the plates 8 and 8', is effected through mechanical connection of the contacting surfaces due to elastic deformation of the flexible buses 11 and 11'. In this case, between the spherical surfaces of the cover pieces 15 and 15' and the supporting surfaces of the flat cover plates 16 and 16', respectively, there is a gap of 2 to 3 mm adjusted in the course of assembly. As the device rotates and as the current-conducting wedges 10 and 10' move in the radial direction, this gap is reduced to zero.

The motion of the current-conducting wedges 10 and 10' is effected by the centrifugal forces of gravity. As this takes place, each of the current-conducting wedges 10 and 10' can turn in any direction, due to the convex spherical surface of its respective cover piece 15 and 15', by an angle, which is determined by possible inaccuracies in the manufacture and assembly of the device, with respect to the flat supporting surface of the cover plates 16 and 16', respectively. This helps to maintain strict mutual orientation of the electrically contacting surfaces of the current-conducting wedges 10 and 10' and the plates 8 and 8', respectively, and ensures their firm compression toward each other.

The present invention can find wide application in developing high-power, high-speed synchronous electrical machines with heavy exciting currents and, more particularly, in developing turbogenerators with a rotational speed of 1,500 and 1,800 r.p.m. for nuclear power stations and turbogenerators with a speed of 3,000 and 3,6000 r.p.m. for nuclear and thermal power stations.

What is claimed is:

1. In a system including
   a synchronous electrical machine having
   a rotor with
   a winding,
   a shaft with
   an axial bore, and
   a first half-sleeve mounted on said shaft;
   an exciter having
   a rotor;
   a shaft with
   an axial bore and
   a second half-sleeve mounted on said shaft; and
   bolts to join said first and second half-sleeves;
   a device to electrically connect said winding of said rotor of said synchronous electrical machine to said exciter, comprises:
   at least one pair of current-conducting rods extending from said winding of said rotor of said synchronous electrical machine towards said exciter and arranged in said axial bore of said shaft of said synchronous electrical machine, each of said current-condicting rods being bent at a right angle and forming a contact surface shaped like a tapered plate;
   at least one pair of current-conducting rods extending from said exciter towards said winding of said rotor of said synchronous electrical machine and arranged in said axial bore of said shaft of said exciter;
   two profiled spacers of an insulation material insulating said tapered plates from said shaft of said synchronous electrical machine and said first half-sleeve,
   said profiled spacers enveloping said plates and being shaped similarly to said plates;
   two current-conducting wedges having two supporting surfaces,
   a first of said supporting surfaces of each current-conducting wedge being in contact with the tapered surface of a respective plate;
   two insulation spacers arranged between said shaft of said exciter and a second of said supporting-surfaces of each of said current-conducting wedges;
   two flexible buses assembled into a pack and arched, said buses permanently connecting said current-conducting rods extending from the exciter to said current-conducting wedges; and
   a central insulation spacer arranged between said diametrically opposite current-conducting wedges and said flexible buses.

2. A device as claimed in claim 1, wherein said second supporting surface of each current-conducting wedge on the side of the wedge's connection to said flexible bus and each said insulation spacer, whereupon said supporting surface of each current-conducting wedge rests, are perpendicular to the rotation axes of said rotors of said synchronous electrical machine and said exciter.

3. A device as claimed in claim 1, wherein each flexible bus is connected to that portion of a respective current-conducting wedge which rests upon and insulation spacer adjacent to said shaft.

4. A device as claimed in claim 2, wherein each flexible bus is connected to that portion of said respective current-conducting rod which rests upon and insulation spacer adjacent to said shaft.

5. A device as claimed in claim 1, wherein each flexible bus is connected to that portion of said respective current-conducting wedge which is in contact with said current-conducting rod bent at a right angle.

6. A device as claimed in claim 2, wherein each flexible bus is connected to that portion of said respective current-conducting wedge which is in contact with said current-conducting rod bent at a right angle.

7. A device as claimed in claim 1, wherein said supporting surface of said current-conducting wedge on the side of the wedge's connection to said flexible bus is shaped like a convex sphere.

* * * * *